United States Patent Office 2,949,444

Patented Aug. 16, 1960

2,949,444

INTERPOLYMERS OF ACRYLONITRILE AND 1-VINYLIMIDAZOLES

Julian Keith Lawson, Jr., Decatur, Ala., assignor to The Chemstrand Corporation, Decatur, Ala., a corporation of Delaware

No Drawing. Filed Aug. 2, 1957, Ser. No. 675,810

6 Claims. (Cl. 260—80.5)

This invention relates to acrylonitrile polymers and more particularly to interpolymers of acrylonitrile, 1-vinylimidazoles and another unsaturated monomer copolymerizable therewith.

Articles, such as filamentary products, formed from polyacrylonitrile are characterized by relatively high softening point, high strength, and insensitivity to water and common organic solvents such as those used in the dry-cleaning industry. However, while the inertness of articles formed from polyacrylonitrile renders such articles of great importance in the textile and other arts, it is disadvantageous when dyed articles are desired, since the conventional dyeing methods are not applicable. Articles having properties the same as or approximating those of polyacrylonitrile but adapted to being dyed in an aqueous dyebath, for example in an aqueous bath containing an acid dyestuff, are much to be desired.

This invention has a primary object the preparation of acrylonitrile polymers which can be readily dyed with conventional dyes, using an aqueous dyebath. A further object of the invention is to provide acrylonitrile polymers which can be formed into shaped articles such as oriented fibers, yarns, films, foils, rods, etc. having good tensile strength and susceptibility to being dyed. Other objects will appear hereinafter.

The objects of the invention are achieved by copolymerizing together acrylonitrile, a 1-vinylimidazole and another monomer containing the $>C=C<$ linkage which is copolymerizable with acrylonitrile and the 1-vinylimidazole.

The acrylonitrile/1-vinylimidazole polymers may be prepared by several different polymerization methods including mass or bulk polymerization, solution polymerization or by the so-called emulsion or suspension polymerization method in aqueous medium. The methods of preparation preferably utilize a mixed-monomer addition technique in accordance with which the monomers are mixed in the proportions desired in the ultimate copolymer and added continuously to the reaction medium throughout the course of the reaction, the conditions of the copolymerization being selected to yield copolymers of substantially uniform composition and molecular weight. As an example, such substantially uniform copolymers may be obtained by the solution polymerization method described in Chaney Patent No. 2,537,031, issued January 9, 1951.

The copolymerization of acrylonitrile, the 1-vinylimidazole and other monomer may be catalyzed with a wide variety of the free radical-producing substances, for example, peroxy compounds and preferably the water-soluble peroxy compounds such as hydrogen peroxide, sodium peroxide, potassium persulfate, calcium percarbonate, and other peroxy acid salts. Azo catalysts may also be used, suitable members of that class being, for example azo-2,2′-diisobutyronitrile, dimethyl-2,2′-azodiisobutyrate, 2,2′-azobis (2,4-dimethylvaleronitrile), and 2,2′-azodiisobutyramide. In addition, diazoaminobenzene may be used as catalyst. It appears that the catalyst used in the copolymerization of acrylonitrile, the 1-vinylimidazole and other monomer influences the solubility of the resulting polymer. The azo catalysts are preferred when it is desired to produce a polymer which is soluble in N,N-dimethylacetamide, since the copolymer of acrylonitrile and a 1-vinylimidazole prepared using a peroxy catalyst such as potassium persulfate have not been found to exhibit good solubility in that solvent.

The emulsion or dispersing agents used when the copolymerization is effected by the emulsion or suspension method may be any compound containing a hydrophobic and a hydrophilic group. Suitable emulsifying or dispersing agents include the common soaps such as sodium stearate and other alkali metal salts of high molecular weight, carboxylic acids and mixtures thereof as obtained by the saponification of animal and vegetable fats, the salts of sulfonated hydrocarbons, for example the alkali metal salts of sulfonated paraffins, sulfonated naphthalenes, sulfonated alkyl-benzenes, the salts of formaldehyde-condensed sulfonic acids and particularly the sodium salt of formaldehyde-condensed alkylaryl sulfonic acids, the salts of triethanolamine and other "amino soaps," and alkali salts of sulfuric half-esters of fatty alcohols.

The acrylonitrile/1-vinylimidazole polymers may also be prepared by the "redox" method in the presence of sulfur dioxide, sodium bisulfite, sodium thiosulfate and other compounds containing low-valent sulfur. The "redox" method of copolymerization usually results in high molecular weight copolymers at lower operating temperatures.

The polymers may be of any suitable molecular weight, but ordinarily the molecular weight is within the range of 15,000 to 300,000, more particularly from 35,000 to 300,000 or higher, and advantageously is within the range of about 50,000 to about 150,000 as calculated from viscosity measurements using the well-known Staudinger equation.

Molecular weight regulators may be included in the copolymerization mix. Examples of suitable regulators are t-dodecyl mercaptan, thioglycollic acid, thiourea, mercaptobenzothiazole, and carbon tetrachloride. These and other of the known regulators tend to inhibit the formation of excessively high molecular weight polymer fractions or increments and to induce a more uniform size of polymer molecule.

In utilizing the emulsion or suspension polymerization technique the polymerization is preferably initiated by heating a reactor containing water to the temperature at which the polymerization is to be conducted, and the reactor is then charged with at least a portion of the catalyst and with the dispersing or emulsifying agent. If a molecular weight regulator and/or a "redox" agent are to be used, these are charged to the reactor with or immediately after the addition of the dispersing agent and the portion of the catalyst. The mixture is vigorously agitated, for example by means of a mechanical stirrer or by tumbling or rotating the reactor. When the reaction medium has been prepared and the conditions of the polymerization have been established, the monomers, either pre-mixed or in separate streams, are added to the reactor gradually, in the proportions desired in the copolymer. Substantially uniform reaction conditions are thus maintained in the vessel. Similarly, the catalyst, emulsifying agent, and other reagents are added gradually or intermittently throughout the reaction, to maintain in the reactor, exactly or approximately, a uniform and constant concentration of the essential reagents from the beginning to the end of the polymerization. The reaction is allowed to proceed until the monomers have been added in the predetermined amount after which it is terminated by lowering the temperature, by destroying the catalyst, or by rapid steam-distillation of unreacted monomers.

In order to maintain substantially uniform reaction conditions through the polymerization, the reaction is preferably carried out at the reflux temperature, and the monomers are added at a rate correlated with the rate and temperature of reflux to maintain the reflux temperature substantially constant. The relative proportions of the monomers added to the reactor should correspond to the proportion of acrylonitrile to 1-vinylimidazole to other monomer in the interpolymer being formed.

Upon completion of the polymerization, an emulsion or suspension of solid polymer in the aqueous medium is obtained. The interpolymer may be recovered by coagulation followed by filtration.

Ternary polymers may be obtained in accordance with this invention which contain the molecule, in addition to at least about 50 percent by weight of acrylonitrile and at least 2 percent by weight of a 1-vinylimidazole, a third monomer containing the >C=C< linkage and copolymerizable with acrylonitriles and the 1-vinylimidazole, including the vinyl esters and especially the vinyl esters of saturated aliphatic monocarboxylic acids, e.g., vinyl acetate, vinyl propionate, vinyl butyrate, etc.; vinyl and vinylidene halides, e.g., the vinyl and vinylidene chlorides and fluorides; allyl-type alcohols, e.g., allyl alcohol, methallyl alcohol and other unsaturated monohydric alcohols; allyl, methallyl and ohter unsaturated monohydric alcohol esters of monobasic acids, e.g., allyl and methallyl acetates, laurates, cyanides, etc.; acrylic and alkacrylic acids, e.g., methacrylic, ethacrylic etc., and esters and amides of such acids, e.g., methyl, ethyl, propyl, butyl, etc., acrylates and methacrylates, acrylamide, methacrylamide, N-methyl, -ethyl, -propyl, -butyl, etc. acrylamides and methacrylamides etc.; methacrylonitriles, ethacrylonitrile and other hydrocarbon-substituted acrylonitriles; unsaturated aliphatic hydrocarbons containing a >C=C< grouping such as isobutylene, etc., and other vinyl, acrylic and other compounds containing a single >C=C< group which are copolymerizable with acrylonitrile and the 1-vinylimidazoles to yield ternary polymers. Alkyl esters of alpha, beta-unsaturated polycarboxylic acids may also be copolymerized with acrylonitrile and the selected 1-vinylimidazole in accordance with the invention. Examples of such esters are the dimethyl, -ethyl, propyl, -butyl, etc. esters of maleic, fumaric, citraconic, etc. acids. Such third components may be present in the polymer molecule preferably in an amount of from 1 to 18 percent by weight, the upper limit on the proportion of the third monomer being determined by the proportion of acrylonitrile present and, in any case, the total of the three monomers equalling 100. Examples of ternary polymers, are, for instance, those of 90 percent of acrylonitrile, 6 percent of vinyl chloride, and 4 percent of a 1-vinylimidazole; those of 90 percent acrylonitrile, 3 percent of a 1-vinylimidazole, and 7 percent of vinylidene chloride, and those of 82–83 percent acrylonitrile, 11–12 percent of methacrylonitrile, and 5–7 percent of a 1-vinylimidazole.

The proportion of acrylonitrile in the polymer molecule will determine the use to which the polymer is adapted, as well as its solubility. Those polymers containing at least 80 percent of acrylonitrile and at least 2 percent of a 1-vinylimidazole along with the third monomer may be prepared and dissolved in such solvents as N,N-dimethylformamide, ethylene carbonate, $\gamma$-butyrolactone, a-cyanoacetamide, N,N-dimethylacetamide, maleic anhydride or other solvents known to have the property of dissolving polyacrylonitrile and high acrylonitrile copolymers, and spun into a suitable liquid which is a non-solvent for the coploymer and a solvent or extractive for the spinning solvent to form fibers having excellent acid dye acceptance, high strength, good luster and resistance to dry-cleaning media. Fibers formed from such polymers have been dyed to deep fast shades in an aqueous bath containing an acid dye, using conventional dyeing conditions. The shade obtained compared favorably with the shade of fibers containing acrylonitrile and a much higher proportion of 2-vinylpyridine, dyed under the same conditions. The setting liquid may be, for example, water or mixtures of water with a predetermined proportion of the spinning solvent.

Those acrylonitrile/1-vinylimidazole interpolymers which contain less than 80 percent of acrylonitrile, i.e. about 50 percent, more than about 20 percent of the 1-vinylimidazole and the remainder the other monomer are used for blending with acrylonitrile polymers which are not receptive to dyestuffs, to obtain dyeable blends, or they may be used as coating compositions or for other purposes.

The 1-vinylimidazoles that may be copolymerized with acrylonitrile include 1-vinylimidazole per se and the corresponding polymerizable 1-vinylimidazoles which may have hydrocarbon groups of preferably not more than five carbons attached to the imidazole nucleus, i.e., preferably 1-vinylimidazoles having only carbon, hydrogen, and the two nitrogen atoms. Examples of the nuclearly alkylated 1-vinylimidazoles which may be copolymerized with acrylonitrile in the practice of this invention include 2-ethyl-1-vinylimidazole, 2-methyl-1-vinylimidazole, 4-ethyl-1-vinylimidazole, 4-methyl-1-vinylimidazole, 5-ethyl-1-vinylimidazole, 5-methyl-1-vinylimidazole, 2,4-diethyl-1-vinylimidazole, 4,5-diethyl-1-vinylimidazole, 2,5-diethyl-1-vinylimidazole, 2,4-dimethyl-1-vinylimidazole, 4,5-dimethyl-1-vinylimidazole, 2,5-dimethyl-1-vinylimidazole, 2-butyl-1-vinylimidazole, 4-amyl-1-vinylimidazole, etc., and the 2-, 4-, and 5-, 1-vinylimidazoles generally in which the alkyl group contains up to five carbons, and, in the case of those derivatives which contain more than one alkyl group, and alkyl groups are the same or different.

Further details of the preparation of the new polymers are set forth in the following examples, the parts being by weight unless otherwise stated.

*Example I*

A three-necked glass reaction vessel provided with a mechanical stirrer, a thermometer, and a reflux condenser was charged with 95 parts by weight of acrylonitrile and 5 parts by weight of 1-vinylimidazole, 0.5 part of azo-a,a'diisobutyronitrile, and 1000 parts of distilled water. The copolymerization was conducted by heating the vessel and its contents at 70° C. for four hours, after which the polymer was separated by filtration, washed with water, and dried. A solution of the copolymer in N,N-dimethylacetamide was spun into a water-N,N-dimethylacetamide coagulating bath, through a spinneret to obtain fibers which were washed and processed in the usual manner. During their processing, the fibers were stretched and oriented. The fibers were receptive to the acid dyes, a skein thereof being dyed to a brilliant scarlet shade in a dyebath containing 0.02 gm. of Wool Fast Scarlet, 0.1 gm. sulfuric acid, and 41 gms. of water for each gram of fiber, and heated to 100° C.

*Example II*

Using the procedure described in Example I, an interpolymer of 90 percent acrylonitrile, 4 percent of 1-vinylimidazole and 6 percent methyl acrylate is prepared. Fibers formed from the polymer as in Example I may be dyed to a scarlet shade by the procedure described in Example I.

*Example III*

Using the procedure of Example I, a copolymer of 90 parts by weight of acrylonitrile, 3 parts by weight of 1-vinylimidazole and 7 parts by weight of vinyl acetate is prepared, dissolved in N,N-dimethylacetamide and spun into fibers which are readily dyeable. The exhaustion of a dyebath as described in Example I is readily accomplished.

*Example IV*

A mixture of 25 parts of acrylonitrile, 20 parts of 1-vinylimidazole and 5 parts of styrene, 100 parts of water, 2 parts of sodium stearate, and 0.5 part of diazoaminobenzene is charged to a pressure vessel. The vessel is flushed with nitrogen and sealed, after which it is placed in a tumbling oven. The vessel and its contents are maintained at 90° C. for 16 hours. The ternary polymer is recovered after washing the reaction mixture with water. It is blended in N,N-dimethylacetamide with an acrylonitrile copolymer containing 95 percent of acrylonitrile which is not normally receptive to the acid dyes to obtain a blend of 15 percent solids (88 percent of the base polymer and 12 percent of the 1-vinylimidazole copolymer), and the solution is spun into a N,N-dimethylacetamide-water coagulating mixture.

The fibers are washed with water and processed in the usual manner and during processing they are stretched and oriented. In a dyebath containing 41 gms. of water, 0.1 gm. sulfuric acid, and 0.02 gm. Wool Fast Scarlet for each gram of fiber, the fibers develop a scarlet color. Using both the standard dyebath mentioned essentially complete dyebath exhaustion is obtained in one hour at 100° C.

When the above examples are repeated with interpolymers containing other of the monomers listed hereinabove such as vinyl chloride methyl methacrylate, styrene, allyl acetate, etc.; with other 1-vinylimidazoles; and in the defined proportions; similiar excellent results and products are obtained.

The foregoing detailed description has been given for illustrative purposes only, and no unnecessary limitations are to be understood therefrom. The invention is not limited to the exact details shown and described, since obvious modifications will occur to those skilled in the art.

This application is a continuation-in-part of my copending application Serial No. 214,231, filed March 6, 1951, now abandoned.

I claim:

1. An interpolymer of monomers consisting of (1) at least about 80 percent of acrylonitrile, (2) at least about 2 percent by weight of a monomer selected from the group consisting of 1-vinylimidazole and alkyl substituted 1-vinylimidazoles wherein the alkyl group contains no more than 5 carbon atoms and (3) from 1 to 18 percent of a third monomer selected from a group consisting of a vinyl ester, an alkyl acrylate, and styrene.

2. An interpolymer of monomers consisting of (1) at least about 80 percent of acrylonitrile, (2) at least about 2 percent by weight of a monomer selected from the group consisting of 1-vinylimidazole and alkyl substituted 1-vinylimidazoles wherein the alkyl group contains no more than 5 carbon atoms and (3) from 1 to 18 percent of a vinyl ester.

3. An interpolymer of monomers consisting of (1) at least about 80 percent of acrylonitrile, (2) at least about 2 percent by weight of a monomer selected from a group consisting of 1-vinylimidazole and alkyl substituted 1-vinylimidazoles wherein the alkyl group contains no more than 5 carbon atoms and (3) from 1 to 18 percent of an alkyl acrylate.

4. An interpolymer of monomers consisting of (1) at least about 80 percent of acrylonitrile, (2) at least about 2 percent by weight of a monomer selected from a group consisting of 1-vinylimidazole and alkyl substiuted 1-vinylimidazoles wherein the alkyl group contains no more than 5 carbon atoms and (3) from 1 to 18 percent of vinyl acetate.

5. An interpolymer of monomers consisting of (1) at least about 80 percent of acrylonitrile, (2) at least about 2 percent by weight of a monomer selected from a group consisting of 1-vinylimidazole and alkyl substituted 1-vinylimidazoles wherein the alkyl group contains no more than 5 carbon atoms and (3) from 1 to 18 percent of methyl acrylate.

6. An interpolymer of monomers consisting of (1) at least about 80 percent of acrylonitrile, (2) at least about 2 percent by weight of a monomer selected from a group consisting of 1-vinylimidazole and alkyl substituted 1-vinylimidazoles wherein the alkyl group contains no more than 5 carbon atoms and (3) from 1 to 18 percent of styrene.

References Cited in the file of this patent

UNITED STATES PATENTS 2,603,621 Craig et al. ------------ July 15, 1952
2,661,346 Wesp et al. ------------ Dec. 1, 1953
2,688,008 Chaney et al ----------- Aug. 31, 1954
2,831,827 Hopff et al. ------------- Apr. 22 1958